(12) United States Patent
Zhang et al.

(10) Patent No.: US 12,185,403 B2
(45) Date of Patent: Dec. 31, 2024

(54) SUSPEND AND RESUME TECHNIQUES WITH RADIO ACCESS NETWORK (RAN) AND USER PLANE FUNCTION (UPF) BUFFERED DOWNLINK DATA FOR MULTI-USIM USER EQUIPMENT

(71) Applicant: QUALCOMM Incorporated, San Diego, CA (US)

(72) Inventors: Juan Zhang, Beijing (CN); Gavin Bernard Horn, La Jolla, CA (US); Ozcan Ozturk, San Diego, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/629,614

(22) PCT Filed: Aug. 19, 2019

(86) PCT No.: PCT/CN2019/101346
§ 371 (c)(1),
(2) Date: Jan. 24, 2022

(87) PCT Pub. No.: WO2021/031067
PCT Pub. Date: Feb. 25, 2021

(65) Prior Publication Data
US 2022/0287132 A1 Sep. 8, 2022

(51) Int. Cl.
*H04W 76/19* (2018.01)
*H04W 76/27* (2018.01)
*H04W 76/38* (2018.01)

(52) U.S. Cl.
CPC .......... *H04W 76/19* (2018.02); *H04W 76/27* (2018.02); *H04W 76/38* (2018.02)

(58) Field of Classification Search
CPC ...... H04W 76/19; H04W 76/27; H04W 76/38
See application file for complete search history.

(56) References Cited

U.S. PATENT DOCUMENTS

| | | | | |
|---|---|---|---|---|
| 8,072,930 B2* | 12/2011 | Speight | ............. | H04W 52/0225 370/328 |
| 8,228,864 B2* | 7/2012 | Speight | ............. | H04W 52/0225 370/328 |

(Continued)

FOREIGN PATENT DOCUMENTS

| | | | | |
|---|---|---|---|---|
| AU | 2017264182 C1 * | 9/2020 | ............ | H04W 24/08 |
| CN | 103517454 A | 1/2014 | | |

(Continued)

OTHER PUBLICATIONS

International Search Report and Written Opinion—PCT/CN2019/101346—ISAEPO—May 20, 2020.

(Continued)

*Primary Examiner* — Eric Nowlin
(74) *Attorney, Agent, or Firm* — Guang Y. Zhang; Patterson & Sheridan LLP

(57) ABSTRACT

Certain aspects of the present disclosure provide techniques for suspending and resuming user plane downlink data for user equipments (UEs) equipped with multiple universal subscriber identity modules (USIMs).

22 Claims, 11 Drawing Sheets

(56) References Cited

U.S. PATENT DOCUMENTS

| | | | | |
|---|---|---|---|---|
| 8,483,062 | B2* | 7/2013 | Yi | H04L 47/28 370/328 |
| 8,520,694 | B1* | 8/2013 | Bali | H04L 12/12 370/428 |
| 9,078,157 | B2* | 7/2015 | Chiang | H04W 24/04 |
| 9,144,003 | B2* | 9/2015 | Radulescu | H04W 36/34 |
| 9,288,434 | B2* | 3/2016 | Bangolae | H04W 68/00 |
| 9,295,095 | B2* | 3/2016 | Rayavarapu | H04W 76/27 |
| 9,504,081 | B2* | 11/2016 | Anderson | H04W 72/23 |
| 9,743,396 | B2* | 8/2017 | Anderson | H04W 76/30 |
| 10,015,785 | B2* | 7/2018 | Anderson | H04W 72/23 |
| 10,225,780 | B2* | 3/2019 | Chen | H04W 76/20 |
| 10,764,795 | B2* | 9/2020 | Yu | H04W 76/19 |
| 10,849,181 | B2* | 11/2020 | Burbidge | H04W 76/27 |
| 10,986,689 | B2* | 4/2021 | Rayavarapu | H04W 76/28 |
| 11,082,933 | B2* | 8/2021 | Bergquist | H04W 76/28 |
| 11,219,084 | B2* | 1/2022 | Lindheimer | H04W 76/19 |
| 11,246,185 | B2* | 2/2022 | Fujishiro | H04W 76/27 |
| 11,343,767 | B2* | 5/2022 | Höglund | H04W 52/0216 |
| 11,405,834 | B2* | 8/2022 | Deng | H04W 48/20 |
| 11,546,961 | B2* | 1/2023 | Sha | H04W 72/23 |
| 11,576,088 | B2* | 2/2023 | Yu | H04W 36/0033 |
| 11,622,412 | B2* | 4/2023 | Mildh | H04W 76/18 370/329 |
| 2008/0198795 | A1* | 8/2008 | Kim | H04W 72/21 370/328 |
| 2008/0267148 | A1* | 10/2008 | Speight | H04W 52/0225 370/429 |
| 2010/0315948 | A1* | 12/2010 | Yi | H04W 28/0284 370/235 |
| 2011/0063977 | A1* | 3/2011 | Halfmann | H04W 28/0284 370/328 |
| 2012/0033596 | A1* | 2/2012 | Speight | H04W 52/0225 370/412 |
| 2013/0039287 | A1* | 2/2013 | Rayavarapu | H04W 68/005 370/329 |
| 2013/0260740 | A1* | 10/2013 | Rayavarapu | H04W 76/27 455/422.1 |
| 2014/0187236 | A1* | 7/2014 | Chiang | H04W 24/04 455/423 |
| 2014/0220981 | A1* | 8/2014 | Jheng | H04W 76/25 455/437 |
| 2014/0321272 | A1* | 10/2014 | Bangolae | H04W 8/005 370/230 |
| 2014/0321371 | A1* | 10/2014 | Anderson | H04W 72/23 370/329 |
| 2016/0262041 | A1 | 9/2016 | Rönneke et al. | |
| 2017/0070981 | A1* | 3/2017 | Anderson | H04W 76/30 |
| 2017/0245318 | A1* | 8/2017 | Rayavarapu | H04W 76/27 |
| 2017/0347346 | A1* | 11/2017 | Anderson | H04W 72/23 |
| 2017/0353902 | A1* | 12/2017 | Chen | H04W 76/27 |
| 2018/0206080 | A1* | 7/2018 | Chen | H04W 76/40 |
| 2018/0302914 | A1 | 10/2018 | Da Silva et al. | |
| 2019/0053130 | A1 | 2/2019 | Guo et al. | |
| 2019/0053324 | A1* | 2/2019 | Tseng | H04W 76/30 |
| 2019/0132900 | A1 | 5/2019 | Hong et al. | |
| 2019/0215887 | A1* | 7/2019 | Burbidge | H04W 76/27 |
| 2020/0120741 | A1* | 4/2020 | Lindheimer | H04W 76/19 |
| 2020/0187291 | A1* | 6/2020 | Sha | H04W 52/02 |
| 2020/0245242 | A1* | 7/2020 | Höglund | H04W 76/38 |
| 2020/0305097 | A1* | 9/2020 | Bergquist | H04W 76/28 |
| 2020/0413476 | A1* | 12/2020 | He | H04W 28/0278 |
| 2021/0160953 | A1* | 5/2021 | Mildh | H04W 76/18 |
| 2021/0204351 | A1* | 7/2021 | Rayavarapu | H04W 76/27 |
| 2021/0368408 | A1* | 11/2021 | Deng | H04W 36/02 |
| 2022/0053448 | A1* | 2/2022 | Velev | H04W 8/183 |
| 2022/0256630 | A1* | 8/2022 | Wu | H04W 76/15 |
| 2023/0328692 | A1* | 10/2023 | Fujishiro | H04W 68/025 455/458 |

FOREIGN PATENT DOCUMENTS

| | | | | |
|---|---|---|---|---|
| CN | 103858513 | A | 6/2014 | |
| CN | 103858513 | B | 11/2018 | |
| CN | 104429153 | B | 2/2019 | |
| EP | 2557890 | A1 | 2/2013 | |
| EP | 2645803 | A1 * | 10/2013 | H04W 76/19 |
| EP | 3402300 | A1 | 11/2018 | |
| EP | 2645803 | B1 * | 7/2019 | H04W 76/19 |
| EP | 3264855 | B1 * | 1/2020 | H04L 5/0055 |
| EP | 3454623 | B1 * | 3/2021 | H04W 24/08 |
| EP | 3799520 | B1 * | 3/2021 | H04W 24/08 |
| EP | 3897036 | A1 * | 10/2021 | H04W 28/0278 |
| EP | 3799520 | B1 * | 9/2023 | H04W 24/08 |
| JP | 7206390 | B2 * | 1/2023 | H04W 28/0278 |
| RU | 2729703 | C2 * | 8/2020 | H04W 24/08 |
| WO | WO-2014000650 | A1 * | 1/2014 | H04W 36/0011 |
| WO | WO-2022140170 | A1 * | 6/2022 | |
| WO | WO-2023048127 | A1 * | 3/2023 | |

OTHER PUBLICATIONS

"3rd Generation Partnership Project, Technical Specification Group Services and System Aspects, Study on Cellular Internet of Things (IoT) Support and Evolution for the 5G System (Release 16)", V16.1.0, 23.724-G10_CR_Implemented, 3rd Generation Partnership Project, Mobile Competence Centre, 650, Route Des Lucioles, F-06921 Sophia-Antipolis Cedex, France, vol. SA WG2 Jun. 11, 2019, XP051756429, pp. 1-274, sections 6.7, 6.10, 6.19, 6.24, 6.25, 6.38, 6.40.

Ericsson: "KI2 Pending DL Data at AS RAI", SA WG2 Meeting #129-Bis, S2-1811947_Pending DL Data at AS RAI_V5.2, (revision of S2-1811132), 3rd Generation Partnership Project, Mobile Competence Centre 650, Route Des Lucioles, F-06921 Sophia-Antipolis Cedex, France vol. SA WG2, No. West Palm Beach, Florida, US, Nov. 26, 2018-Nov. 30, 2018 Nov. 20, 2018, XP051563473, 15 Pages, sections Discussion, Proposal, 6.19, 6.24, 6.7.

Qualcomm Incorporated: "Evaluation for Small Data Optimization with RAN Context: 5G Up Pptimization vs eM-Connected with RRC Inactive with Data Buffering at CN", SA WG2 Meeting #128-BIS, (was S2-18xxxx) S2-188145_Solution_19_VS_24_4_ Evaluation, 3rd Generation Partnership Project, Mobile Competence Centre, 650, Route Des Lucioles, F-06921 Sophia-Antipolis Cedex, France, vol. SA WG2, No. Sophia-Antipolis, France, Aug. 20, 2018-Aug. 24, 2018 Aug. 14, 2018, XP051537083, 23 Pages, sections 1-3, 6.19, 6.24.

Supplementary European Search Report—EP19942604—Search Authority—Berlin—Mar. 20, 2023.

Huawei., et al., "Considerations on UE Differentiation into Groups of Subscribers for LSin S2-178221", SA WG2 Meeting #124, S2-178886, Reno, Nevada, USA, Nov. 27-Dec. 1, 2017, pp. 1-18.

* cited by examiner

SUSPEND AND RESUME TECHNIQUES WITH RADIO ACCESS NETWORK (RAN) AND USER PLANE FUNCTION (UPF) BUFFERED DOWNLINK DATA FOR MULTI-USIM USER EQUIPMENT

CROSS-REFERENCE TO RELATED APPLICATIONS

This application is a national stage application under 35 U.S.C. 371 of PCT/CN2019/101346 filed Aug. 19, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for suspending and resuming user plane downlink data for user equipments (UEs) equipped with multiple universal subscriber identity modules (USIMs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for supporting scheduling gaps for UEs equipped with multiple universal subscriber identity modules (USIMs).

Certain aspects provide a method for wireless communication that may be performed by a radio access network (RAN) node. The method generally includes receiving, from a user equipment (UE) in a radio resource control (RRC) connected mode with the RAN node, a request to suspend the RRC connected mode with the RAN node; in response to the request: (i) buffering data received by the RAN node and destined for the UE; and (ii) activating a data buffering timer with a predefined amount of time; and transmitting, to the UE, a message to release the RRC connected mode after receiving the request.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
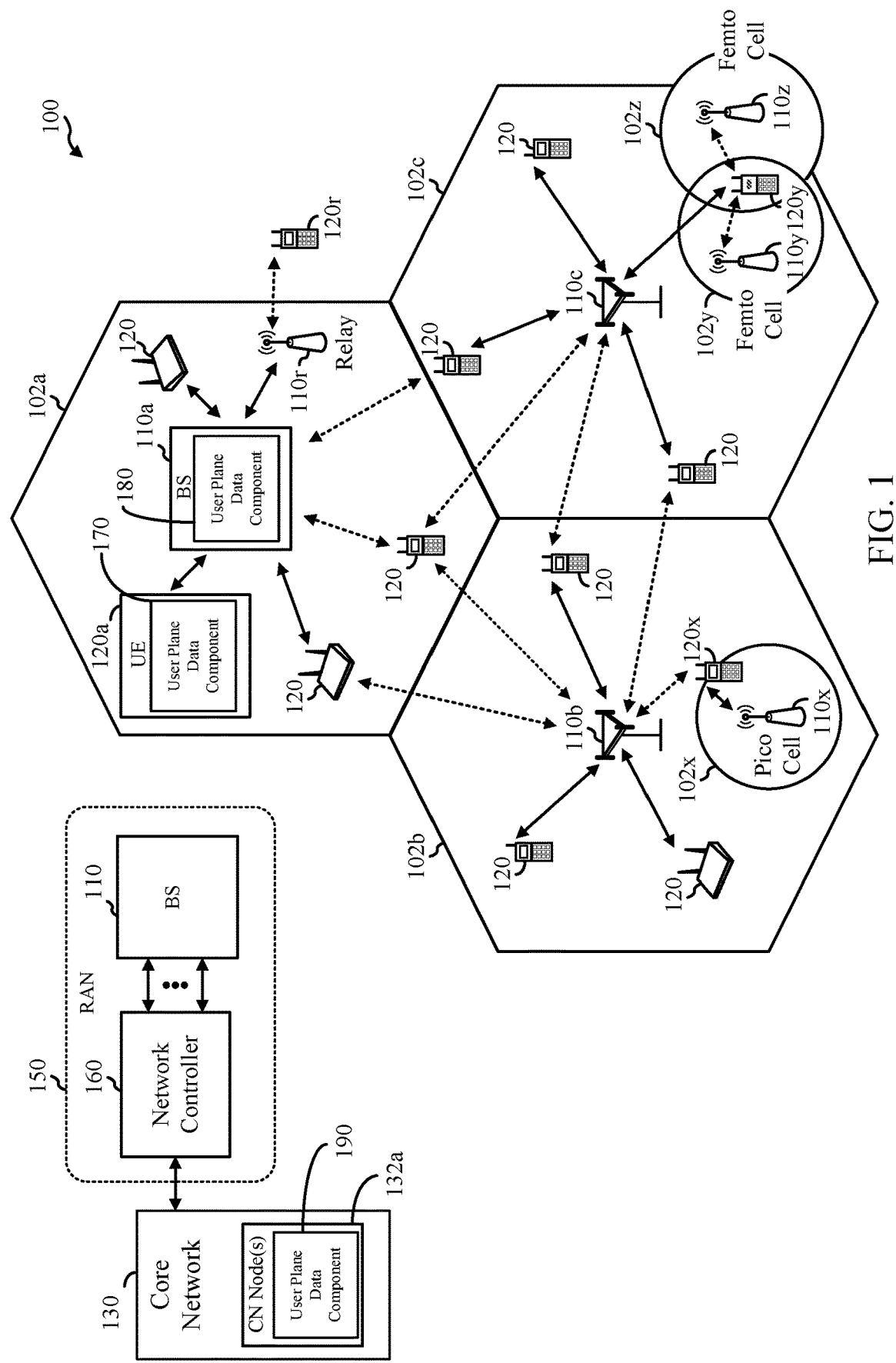
FIG. 1 is a block diagram conceptually illustrating an example telecommunications system, in accordance with certain aspects of the present disclosure.

Aspects of the present disclosure provide apparatus, methods, processing systems, and computer readable mediums for an improved suspend and resume procedures with a RAN and core network (CN). More specifically, the improved suspend procedure described herein can trigger the CN to buffer downlink data for a UE that requests suspension of a radio resource control (RRC) connection with a RAN serving the UE via a first universal subscriber identity module (USIM) of the UE (e.g., the first USIM is in connected mode with the RAN), such that the UE can communicate with other RANs via other USIM(s) without missing downlink data received by the serving RAN that is destined for the UE.

Certain systems (e.g., 5G NR, LTE, etc.) may support communications with UEs equipped with multiple USIMs. A multi-USIM device implementation generally involves the use of common radio and baseband components that are shared among the multiple USIMs. For example, while actively communicating with a first system (e.g., RAN/CN A) via a first USIM, the UE may occasionally transition to one or more second systems (e.g., RAN/CN B to RAN/CN K) via one or more second USIMs to perform one or more communication operations (e.g., monitor a paging channel used by the second system, perform signal measurements, read system information, etc.).

In some cases, the UE may operate in connected mode with a first system via a first USIM (e.g., USIM A) and receive a paging message from a second system via a second USIM (e.g., USIM B). In these cases, if the UE decides to connect to the second system via the second USIM to receive service from the second system, the current service (or connection) with the first system (via the first USIM) may be interrupted, increasing the likelihood of the UE missing data transmissions. Further, even in cases where the UE transmits a suspend message via the first USIM to inform the first system that the UE will be leaving, the suspend message may not be transmitted (or forwarded) to the CN associated with the first USIM. In such cases, the CN may continue to transmit downlink data to the UE when the UE is in connected mode with another CN, causing the UE to miss (e.g., not receive) the downlink data transmission(s). This can significantly reduce network efficiency and performance.

To address this, aspects provide improved techniques for suspending and resuming RRC connections between UEs equipped with multiple USIMs and RANs. As described in more detail below, upon receiving a suspend request from a UE, the RAN may buffer data for the UE and activate a data buffering timer with a predefined amount of time. The RAN may then transmit a message to the UE to release the RRC connection. In some aspects, once the data buffering timer expires, the RAN may forward the suspend request to the CN to trigger the CN to buffer downlink data received by the CN and destined for the UE.

As also described in more detail below, if the RAN receives a resume request from the UE (e.g., after the RRC connection has been released), the RAN may determine whether to initiate a resume procedure based in part on (i) whether the data buffering timer has expired and (ii) whether the RAN has initiated a suspend procedure with the CN. For example, in cases where the data buffering timer has not expired and the RAN has not initiated a suspend procedure with the CN, the RAN may refrain from initiating a resume procedure with the CN. On the other hand, in cases where the data buffering timer has expired and the RAN has initiated a suspend procedure with the CN, the RAN may initiate a resume procedure with the CN.

By providing techniques that enable the RAN to trigger a CN to buffer downlink data during the suspension of a RRC connection between the RAN and a UE, aspects herein can significantly reduce the chances of the UE missing downlink data due to transitioning to another RAN/CN. Though certain aspects are described with respect to UEs equipped with two USIMs, it should be noted that the aspects herein may be applied to UEs equipped with any number of USIMs.

The following description provides examples of techniques for suspending and resuming user plane downlink data for multi-USIM devices in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network), a LTE system, or system that supports both NR and LTE.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A RAN 150 may include a network controller 160 and the BS(s) 110. The RAN 150 may be in communication with a CN 130, which includes one or more CN nodes 132a. The network controller 160 may couple to a set of BSs 110 and provide coordination and control for these BSs 110. The network controller 160 may communicate with the BSs 110 via a backhaul. The BSs 110 may also communicate with one another (e.g., directly or indirectly) via wireless or wireline backhaul. Although a single RAN 150 and a single CN 130 are depicted in FIG. 1, the wireless communication network 100 may include multiple RANs 150 and/or multiple CNs 130. Further, in some cases, the wireless communication network 100 may support RANs/CNs of same RATs, different RATs, or a combination of RATs.

As illustrated, UE 120a includes a user plane data component 170, which is configured to implement one or more techniques described herein for suspending and resuming user plane data. Using the user plane data component 170, the UE 120a may transmit a RRC connection suspend request to a serving RAN (e.g., to suspend a RRC connection with the RAN). The RRC connection may be suspended after receiving a RRC connection release message with a suspend indication. Using the user plane data component 170, the UE 120a may also transmit a RRC connection resume request with a user plane resume indication. The RRC connection resume request with the user plane resume indication may trigger the RAN to resume the RRC connection with the UE and/or trigger the RAN to initiate a user plane data resume procedure with a CN. The UE 120a may receive a RRC Resume message from the RAN, and may return a RRC Resume Complete message to the RAN to indicate a successful resumption of the RRC connection with the RAN.

As also illustrated, BS 110a (e.g., RAN entity or RAN node, such as a gNB or eNB) includes a user plane data component 180, which is configured to implement one or more techniques described herein for suspending and resuming user plane data. Using the user plane data component 180, the BS 110a may receive, from a UE (e.g., UE 120a) in a RRC connected mode with the BS 110a, a request to suspend the RRC connected mode with the BS 110a. In response to the request, the BS 110a (using the user plane data component 180), may (i) buffer downlink data received by the BS 110a and destined for the UE and (ii) activate a data buffering timer (e.g., at the BS 110a) with a predefined amount of time. The BS 110a (using the user plane data component 180) may transmit a message to the UE to release the RRC connected mode after receiving the request.

As further illustrated, CN node 132a (e.g., User Plane Function (UPF)) includes a user plane data component 190, which is configured to implement one or more techniques described herein for suspending and resuming user plane data. Using the user plane data component 190, the CN node 132a may receive a downlink data suspend request from another CN node (e.g., Access and Mobility Management (AMF), Session Management Function (SMF), etc.) to suspend downlink data transmissions destined for a UE (e.g., UE 120a). For example, the UE may have been previously in a RRC connected mode with the RAN node (e.g., BS 110a) associated with the CN node 132a. Upon receiving the downlink data suspend request, the CN node 132a may buffer the downlink data, and refrain from transferring the downlink data to the RAN node. In addition, using user plane data component 190, the CN node 132a may resume the transfer of the downlink data transmissions (e.g., including buffered downlink data) for the UE after receiving a downlink data resume indication from one of the other CN nodes.

Figure 2:
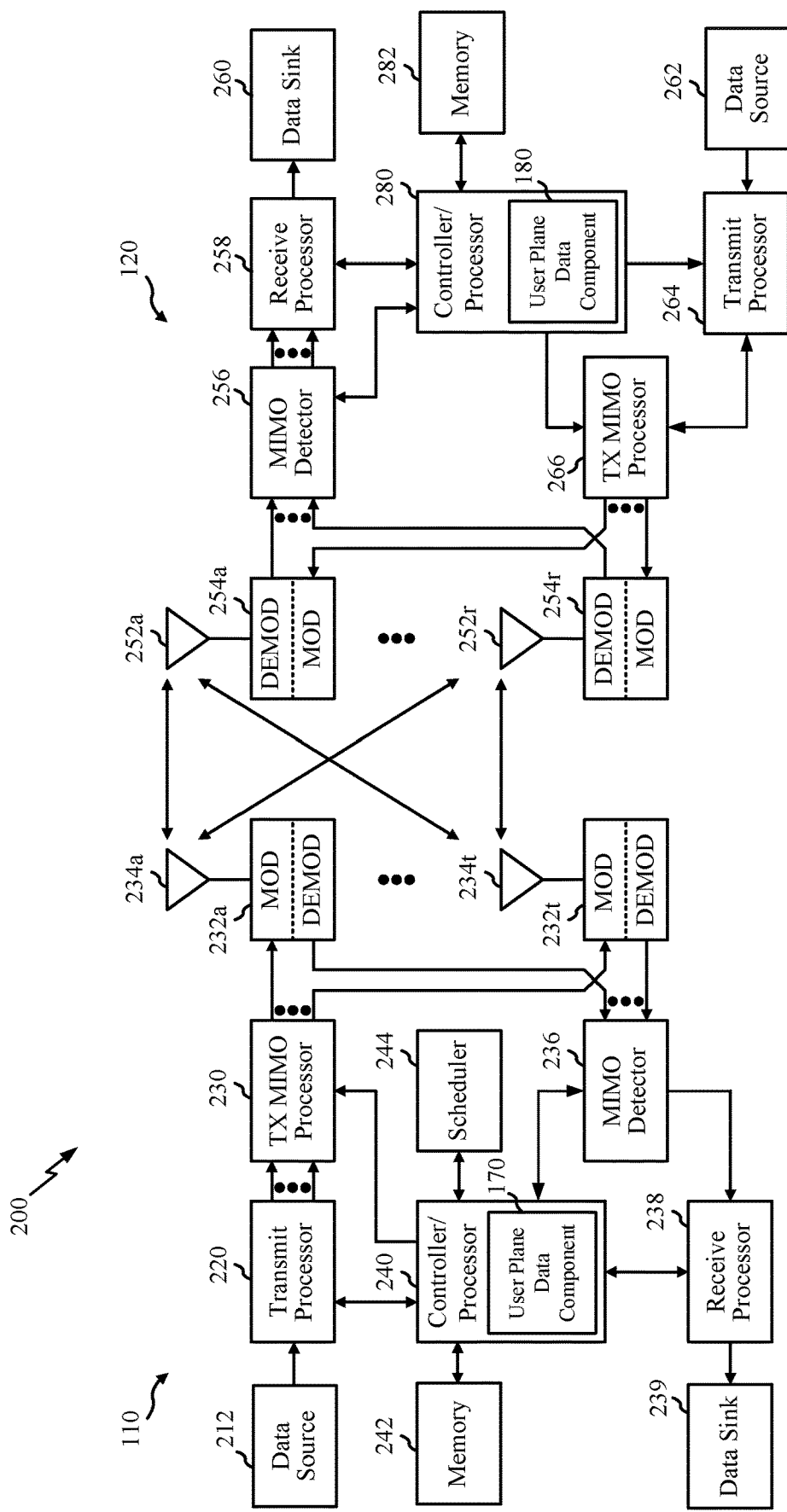
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a has a user plane data component 170, which is configured to implement one or more techniques described herein for suspending and resuming user plane data, according to aspects described herein. Similarly, the controller/processor 240 and/or other processors and modules at the BS 110a may perform or direct the execution of processes for the techniques described herein. For example, as shown in FIG. 2, the controller/processor 240 of the BS 110a has a user plane data component 180, which is configured to implement one or more techniques described herein for suspending and resuming user plane data, according to aspects described herein. Further, although not shown in FIG. 2, a CN node may include a controller/processor and/or other processors and modules that perform or direct the execution of processes for the techniques described herein. For example, the controller/processor of the CN node may include a user plane data component 190, which is configured to implement one or more techniques described herein for suspending and resuming user plane data, according to aspects described herein. Although shown at the Controller/Processor, other components of the UE 120a and BS 110a may be used performing the operations described herein.

Figure 3:
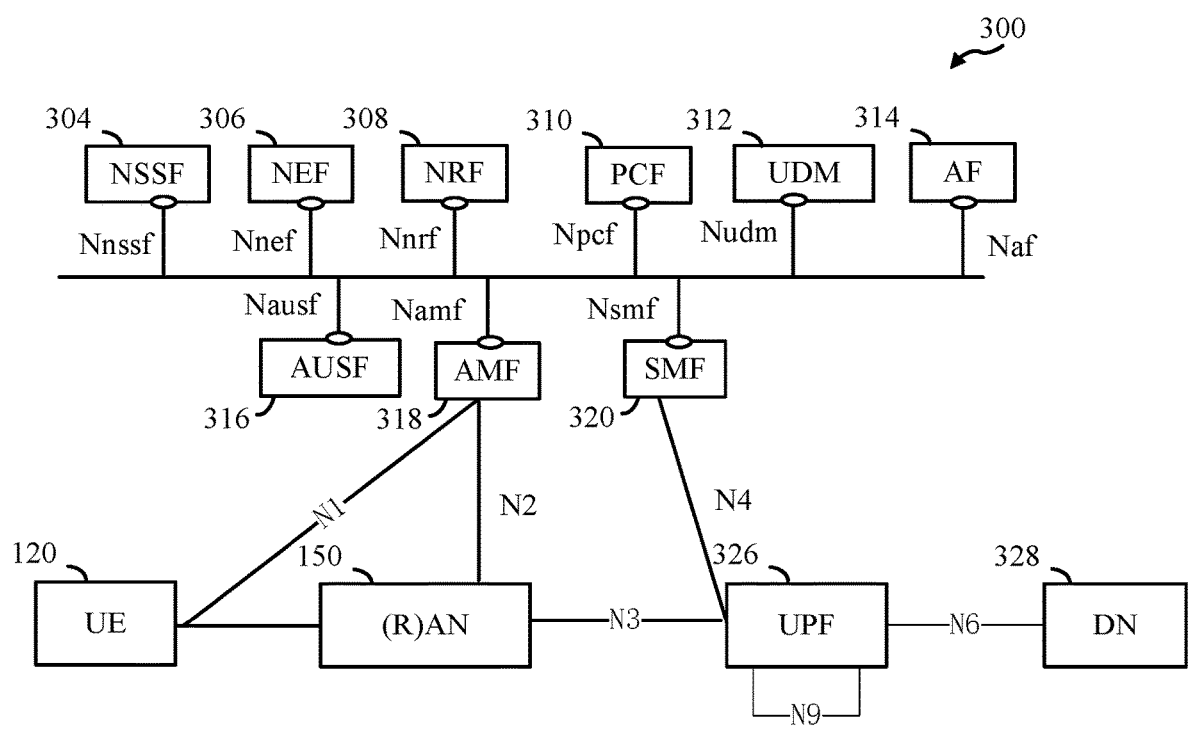
FIG. 3 is a block diagram illustrating an example architecture of a core network (CN) in communication with a radio access network (RAN), in accordance with certain aspects of the present disclosure.

FIG. 3 is a block diagram illustrating an example architecture of a CN 300 (e.g., the CN 130 in FIG. 1) in communication with a RAN 150, in accordance with certain aspects of the present disclosure. As shown in FIG. 2, the example architecture includes the CN 300, RAN 150, UE 120, and data network (DN) 328 (e.g. operator services, Internet access or third party services).

The CN 300 may host core network functions. CN 300 may be centrally deployed. CN 300 functionality may be offloaded (e.g., to advanced wireless services (AWS)), in an effort to handle peak capacity. As shown in FIG. 3, the example CN 300 may be implemented by one or more network entities that perform network functions (NF) including Network Slice Selection Function (NSSF) 304, Network Exposure Function (NEF) 306, NF Repository Function (NRF) 308, Policy Control Function (PCF) 310, Unified Data Management (UDM) 312, Application Function (AF) 314, Authentication Server Function (AUSF) 316, AMF 318, SMF 320; UPF 326, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 318 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 120 and SMF 320; transparent proxy for routing SM messages; access authentication; access authorization; transport for short message service (SMS) messages between UE 120 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 120 and a location management function (LMF) as well as between RAN 150 and LMF; evolved packet service (EPS) bearer ID allocation for interworking with EPS; and/or UE mobility event notification; and/or other functionality.

SMF 320 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 326 may support: packet routing and forwarding, packet inspection, quality-of-service (QoS) handling, external protocol data unit (PDU) session point of interconnect to DN 328, and anchor point for intra-RAT and inter-RAT mobility. PCF 310 may support: unified policy framework, providing policy rules to control protocol functions, and/or access subscription information for policy decisions in UDR. AUSF 316 may acts as an authentication server. UDM 312 may support: generation of Authentication and Key Agreement (AKA) credentials, user identification handling, access authorization, and subscription management. NRF 308 may support: service discovery function, and maintain NF profile and available NF instances. NSSF may support: selecting of the Network Slice instances to serve the UE 120, determining the allowed network slice selection assistance information (NSSAI), and/or determining the AMF set to be used to serve the UE 120.

NEF 306 may support: exposure of capabilities and events, secure provision of information from external application to 3GPP network, translation of internal/external information. AF 314 may support: application influence on traffic routing, accessing NEF 306, and/or interaction with policy framework for policy control. As shown in FIG. 3, the CN 300 may be in communication with the UE 120, RAN 150, and DN 328.

Figure 4:
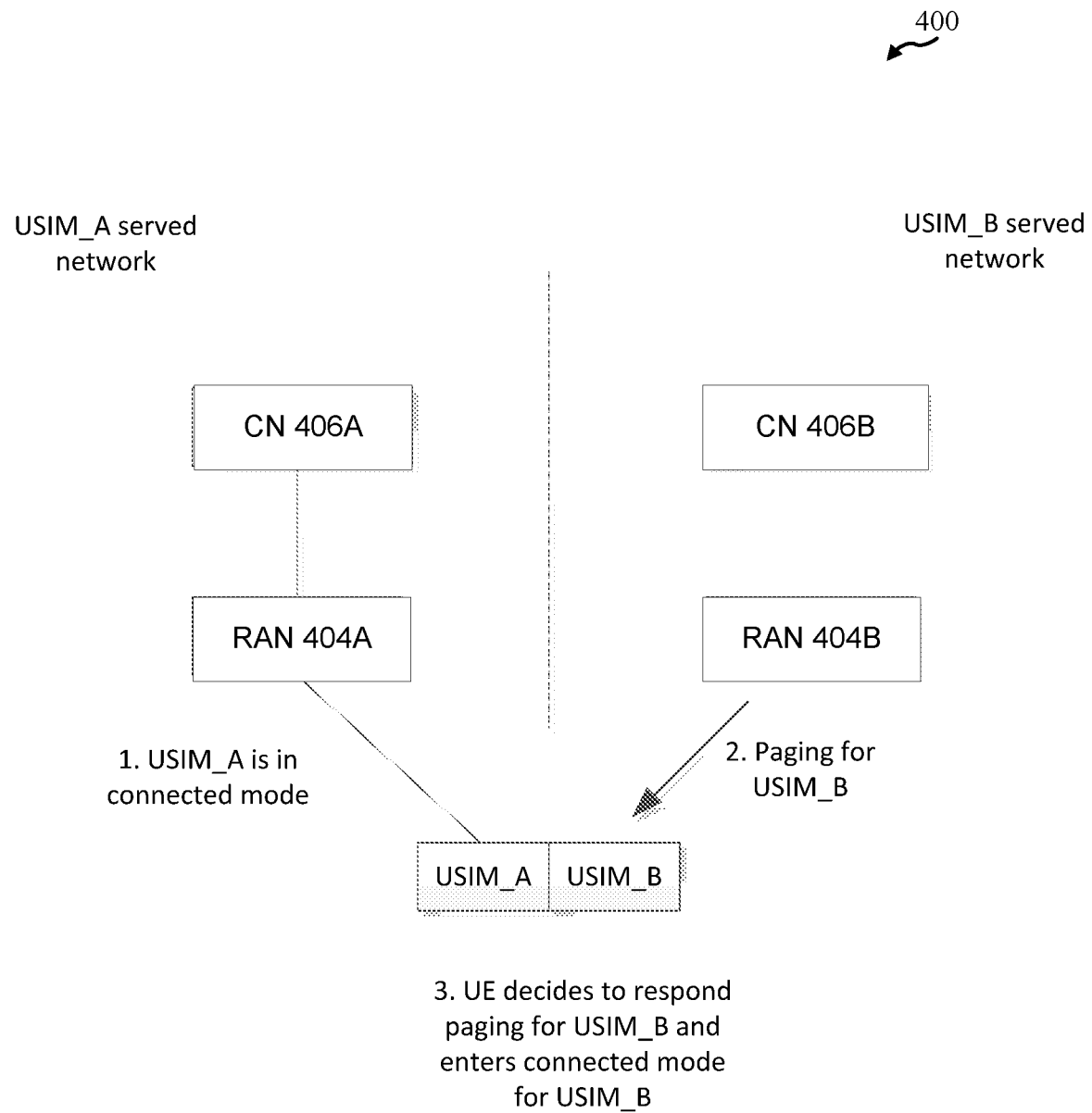
FIG. 4 depicts an example system architecture for a multi-USIM UE interworking between two systems/networks, in accordance with certain aspects of the present disclosure.

FIG. 4 illustrates an example system architecture 400 for a multi-USIM UE interworking between two systems/networks, in accordance with certain aspects of the present disclosure. As shown in FIG. 4, the UE may be served by separate RANs 404A (e.g., E-UTRAN or NR RAN) and 404B (e.g., E-UTRAN or NR RAN) controlled by separate CNs 406A (e.g., EPC or 5GC) and 406B (e.g., EPC or 5GC). The RAN 404A may provide E-UTRA services or 5G NR services. Similarly, the RAN 404B may provide E-UTRA services or 5G NR services. The UE 120 may operate under one RAN/CN at a time (e.g., with a single Tx/Rx).

In one example, in RAN 404A and RAN 404B, the network node(s) may include gNB(s) and, in CN 406A and CN 406B, the network node(s) may include AMF(s). In one example, in RAN 404A and RAN 404B, the network node(s) may include eNB(s) and, in CN 406A and CN 406B, the network node(s) may include MME(s). In one example, RAN 404A may include eNB(s), CN 406A may include MME(s), RAN 404B may include gNB(s), and CN 406B may include AMF(s).

As noted above, in some cases, a UE equipped with multiple USIMs may decide to suspend a RRC connection with a first RAN via a first USIM to enter a connected mode with a second RAN via a second USIM. The UE, for example, may do so in order to receive a paging message from the second RAN or perform other communication operations with the second RAN. In conventional suspend procedures, the UE may transmit a RRC connection suspend request to the RAN to suspend the RRC connection. However, in some cases, the RAN may not transmit (or forward) the suspend request to the CN. As a result, the CN may continue to transmit downlink data to the UE when the UE is in connected mode with another RAN via another USIM of the UE.

Consider the reference example shown in FIG. 4, in which a UE (e.g., UE 120a) is equipped with two USIMs (e.g., USIM A and USIM B). In this example, USIM A is associated with RAN 404A and CN 406A and USIM B is associated with RAN 404B and CN 406B. As shown, the UE may be actively communicating with RAN 404A/CN 406A via USIM A (e.g., USIM A may be in connected mode with RAN 404A). While actively communicating with RAN 404A/CN 406A, the UE may decide to transition to RAN 404B/CN 406B to perform one or more communication operations. Here, for example, the UE monitors a paging channel used by RAN 404B and decides to respond to a paging request from RAN 404B. In this case, the UE may enter a connected mode for USIM B in order to monitor the paging channel and/or respond to the paging request.

Figures 5A, 5B:
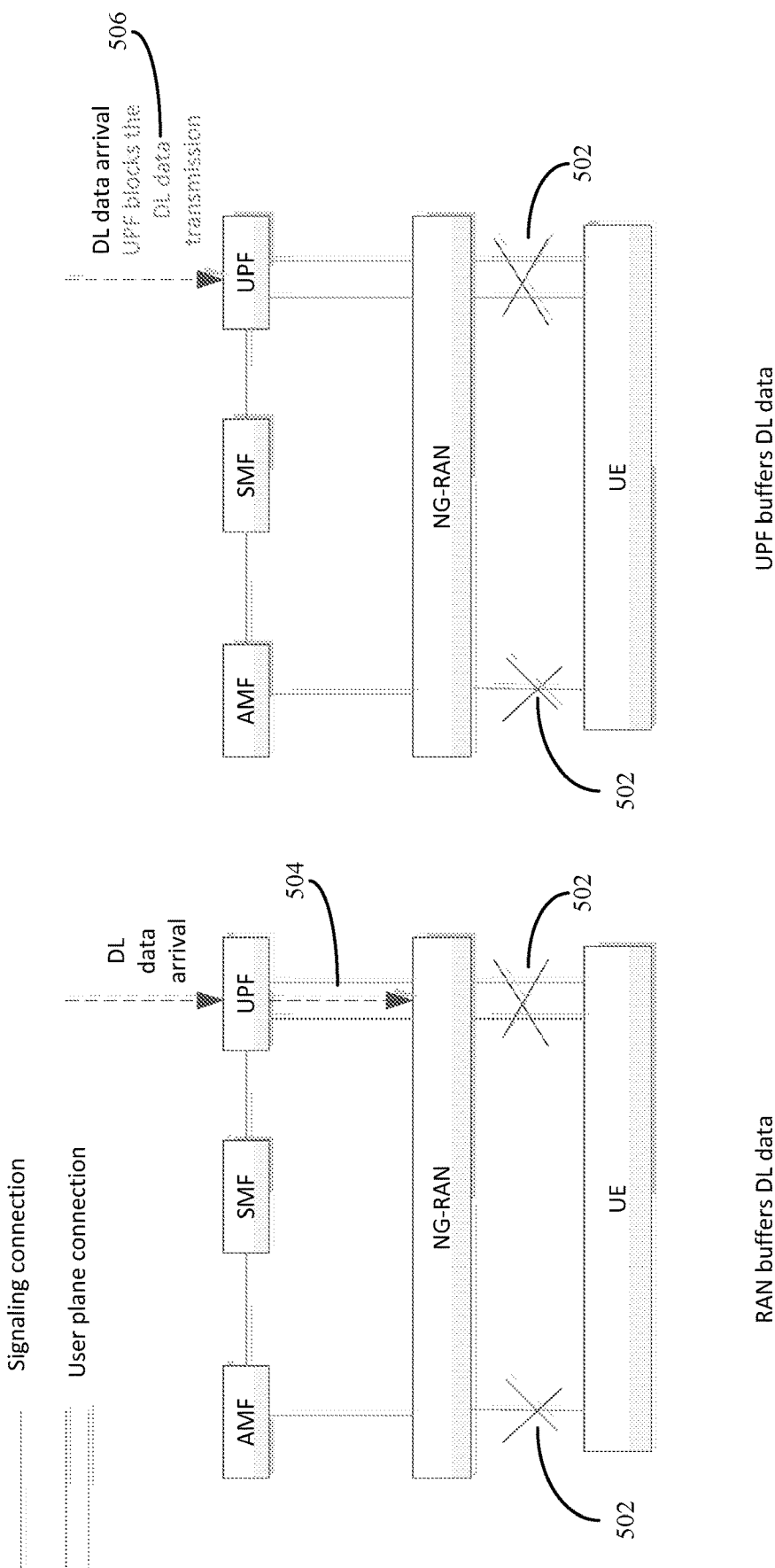
FIG. 5A depicts an example of a RAN buffering DL data, in accordance with certain aspects of the present disclosure.
FIG. 5B depicts an example of a UPF buffering DL data, in accordance with certain aspects of the present disclosure.

When the UE enters the connected mode via USIM B, the radio connection to RAN 404A/CN 406A may be released (or suspended), interrupting the data transmissions between the RAN 404A and the USIM A of the UE. As shown in FIG. 5A, for example, after receiving a RRC connection suspension request from the UE, the NG-RAN may suspend (or release) the user plane and signaling connections between the NG-RAN and the UE (502). However, because the CN may not be aware of the suspensions (e.g., the RAN may not have forwarded the suspension request to the CN), the CN (e.g., UPF) may continue to transmit downlink data that arrives at the CN for the UE to the NG-RAN. While the NG-RAN may be able to buffer some downlink data that arrives from the CN, some of the downlink data destined for the UE may be dropped or missed in cases where the buffer is overloaded and the UE is in connected mode with another RAN/CN. Missing data in these situations can impact the performance and efficiency of the communication system.

Accordingly, it may be desirable to provide techniques for suspending and resuming user plane data for UEs equipped with multiple USIMs.

Example Suspend and Resume Techniques with RAN and UPF Buffered Downlink Data for Multi-USIM UE Aspects of the present disclosure provide techniques for improved suspend and resume procedures with a RAN and CN. As described below, the improved suspend procedure described herein can trigger the CN to buffer downlink data for a UE that requests suspension of a RRC connection with a RAN serving the UE via a first USIM of the UE. As shown in FIG. 5B, for example, compared to FIG. 5A, after receiving the RRC connection suspend request from the UE, the RAN may trigger the CN (e.g., UPF) to buffer downlink data for the UE (e.g., after a data buffering timer has expired) (506). The operation that triggers the UPF to buffer downlink data is described in more detail below. By doing so, techniques described herein can significantly reduce the chances of the UE missing downlink data from a first system while the UE is in connected mode with another system. Note, that while many of the following aspects are described with respect to 5G/NR systems, the techniques described herein can be applied to both LTE and 5G. In some aspects, the techniques described herein can also be applied to multi-USIM devices from separate mobile network operators (MNOs) and same MNOs.

Figure 6:
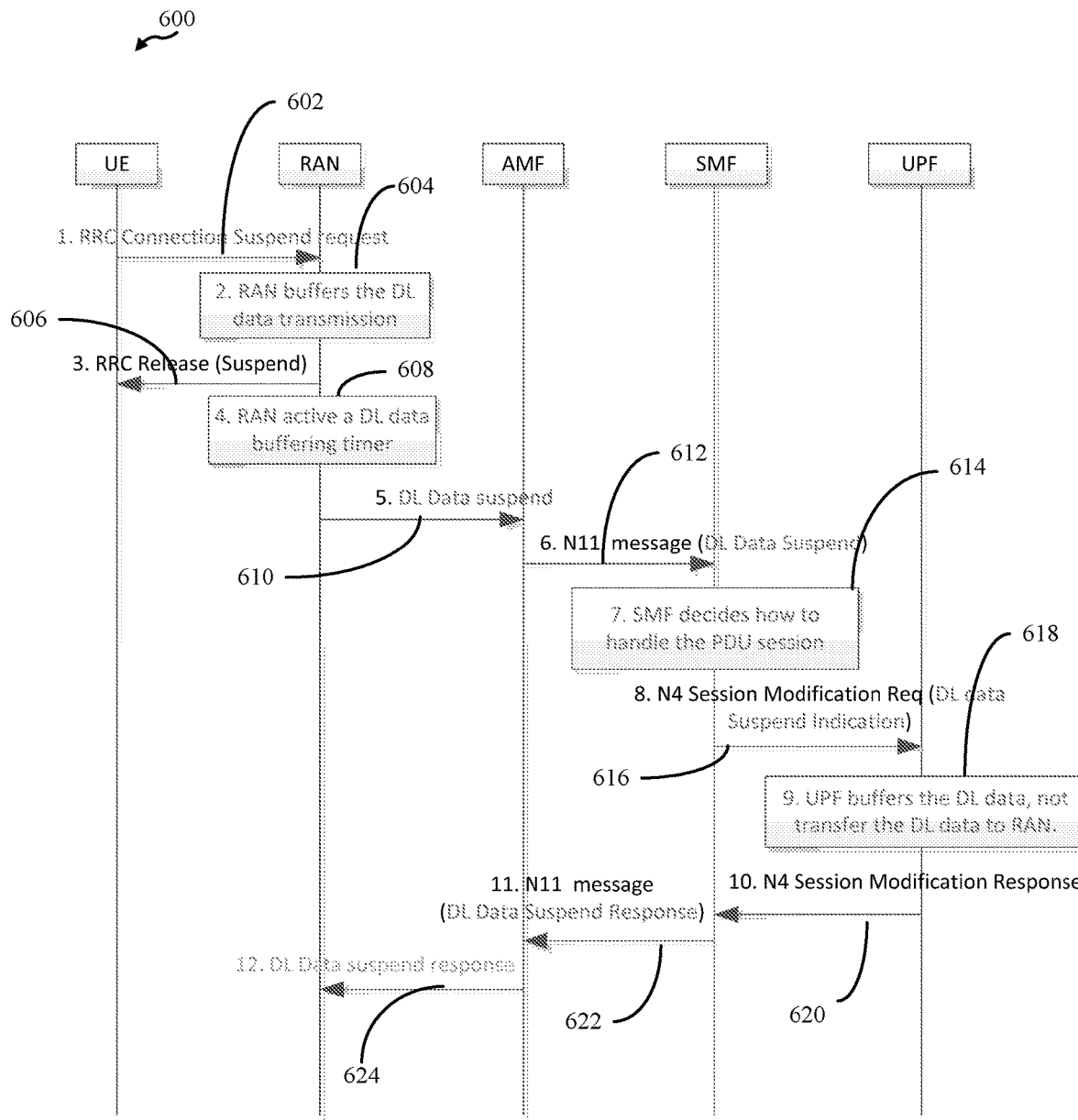
FIG. 6 depicts an example call flow for an access stratum (AS) layer suspend with RAN buffer data procedure, in accordance with certain aspects of the present disclosure.

FIG. 6 depicts an example call flow 600 for an AS layer suspend with RAN buffer data procedure, in accordance with certain aspects of the present disclosure.

At step 602, the UE may transmit an RRC connection suspend request to the RAN, e.g., to request a release of the RRC connection between the RAN and a first USIM of the UE. At step 604, the RAN may buffer downlink data transmission(s) received by the RAN and destined for the UE. In one aspect, the RAN may buffer the received downlink data without paging the UE. At step 606, the RAN transmits a RRC connection release (e.g., with a suspend indication) to the UE. In one aspect, the RAN may transmit the RRC connection release response without notifying the CN (e.g., AMF).

At step 608, the RAN activates a downlink data buffering timer (e.g., with a predefined amount of time). If the downlink data buffer timer expires (e.g., the predefined amount of time has elapsed), the RAN may initiate a downlink data suspend procedure with the CN (e.g., on behalf of the UE). For example, at step 610, the RAN transmits a downlink data suspend request to the AMF. At step 612, the AMF forwards the downlink data suspend request (e.g., in a N11 message) to the SMF that served the UE.

Once the SMF receives the downlink data suspend request, the SMF may decide how to handle the PDU session (step 614). Here, the SMF transmits the downlink data suspend indication (or request) (e.g., in a N4 session modification request) to the UPF (step 616). The downlink data suspend indication triggers the UPF to buffer the downlink data and refrain from transferring the downlink data to the RAN (step 618). After the UPF suspends the downlink data, the UPF transmits a response (e.g., N4 session modification response) to the SMF (step 620), which forwards a response message (e.g., downlink data suspend response) to the AMF (step 622), which forwards the response message (e.g., downlink data suspend response) to the RAN (step 624).

Although not shown in FIG. 6, the RAN may refrain from transmitting a downlink data suspend request (e.g., step 610) to the AMF while the downlink data buffering timer is still active (e.g., has not expired or the predetermined amount of time has not elapsed). The RAN may use the AS layer resume procedure described in FIG. 7, if the RAN receives a RRC connection resume request while the downlink data buffering timer is still active.

Figure 7:
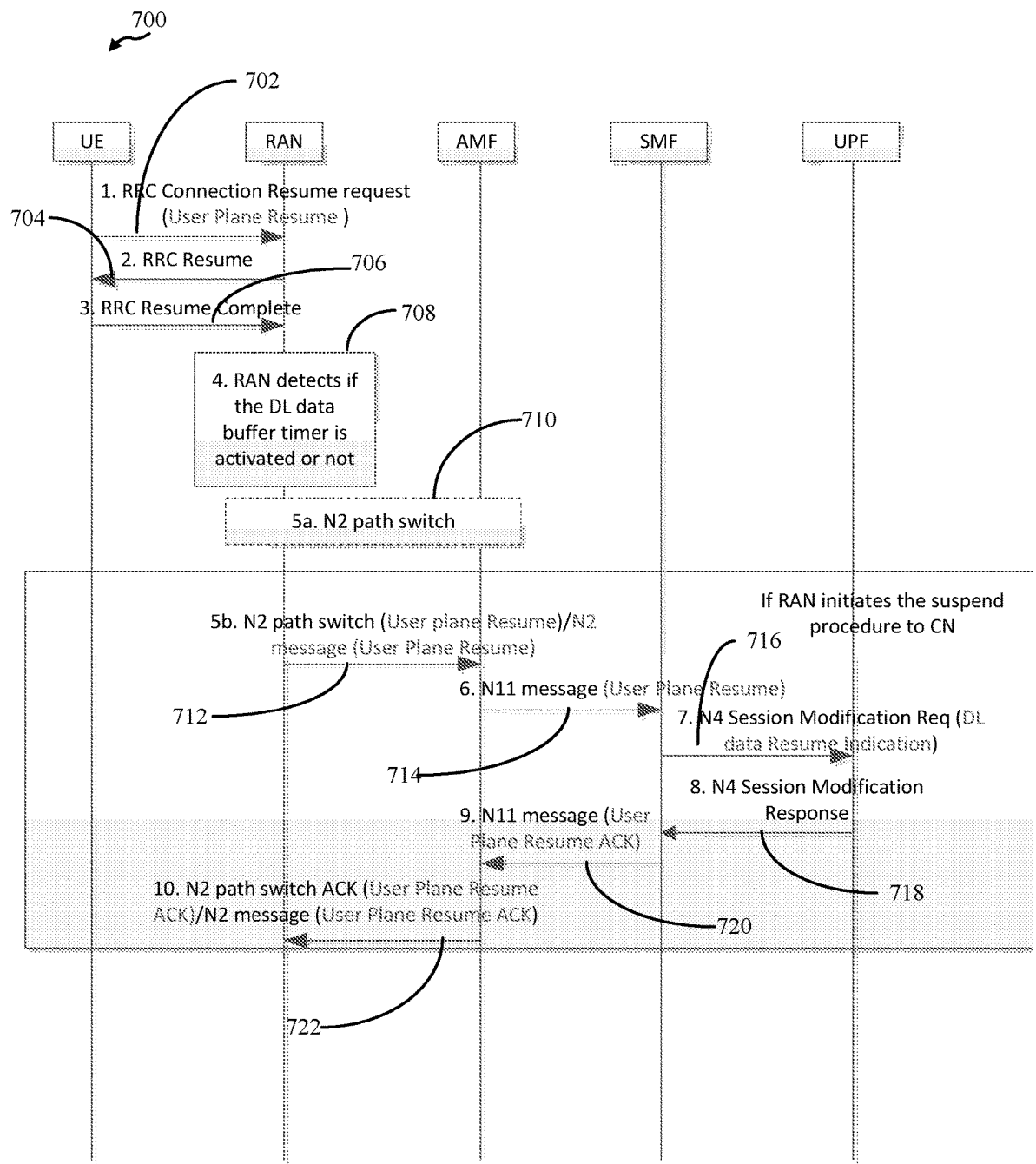
FIG. 7 depicts an example call flow for an AS layer resume procedure, in accordance with certain aspects of the present disclosure.

FIG. 7 depicts an example call flow 700 for an AS layer resume procedure, in accordance with certain aspects of the present disclosure.

At step 702, the UE may transmit a RRC connection resume request to the RAN (e.g., to resume a RRC connection with the RAN). In one aspect, the UE may include a user plane resume request within the RRC connection resume request, e.g., to request that the downlink data transmissions received by the CN and/or the RAN (along with data that has been buffered at the CN and/or the RAN) be forwarded to the UE. At step 704, the RAN transmits a RRC connection resume message to the UE. The UE may then respond with a RRC resume complete message to confirm that the RRC connection between the RAN and the UE is resumed (step 706).

After receiving the user plane resume request (e.g., step 702), the RAN checks whether the downlink data buffering timer has expired and whether the RAN has initiated a data suspend procedure with the CN (step 708). The RAN may determine whether to initiate a data resume procedure with the CN, based on the determination at step 708.

For example, in some aspects, if the RAN determines that the downlink data buffering timer has not expired (e.g., the predetermined amount of time has not elapsed) and the RAN has not initiated a data suspend procedure with the CN on behalf of the UE, the RAN may implement a path switch (step 710). For example, at step 710, the RAN may send a RRC resume (e.g., step 704) for the path switch, if the serving RAN has not changed for the UE. That is, if the RAN that receives the resume request from the UE is the same RAN that received the suspend request from the UE, the RAN may perform step 704 for step 710. On the other hand, if the RAN that receives the resume request from the UE is different from the RAN that received the suspend request from the UE, the (new serving) RAN may initiate a procedure to retrieve the UE context and update the N2 signaling connection to the CN (e.g., AMF) as the path switch (e.g., at step 710).

In some aspects, the RAN may also initiate the path switch at step 710, in cases where the downlink data buffering timer has expired and the RAN has not initiated a suspend procedure with the CN.

In some aspects, if the RAN determines that the downlink data buffering timer has expired (e.g., the predetermined amount of time has elapsed) and the RAN has initiated a data suspend procedure with the CN on behalf of the UE, the RAN may initiate a data resume procedure with the CN to request the CN to resume the PDU session. In particular, the RAN may implement the path switch at step 712 in order to initiate the data resume procedure with the CN. For example, at step 712, the RAN transmits a user plane resume request (e.g., in a N2 message) to the AMF. The AMF forwards the user plane resume request (e.g., in a N11 message) to the SMF (step 714). The SMF then requests the UPF to resume the PDU session (e.g., steps 716 and 718). After receiving a user plane resume acknowledgement from the SMF (step 720), the AMF forwards the response (e.g., user plane resume acknowledgement) to the RAN (step 722).

Figure 8:
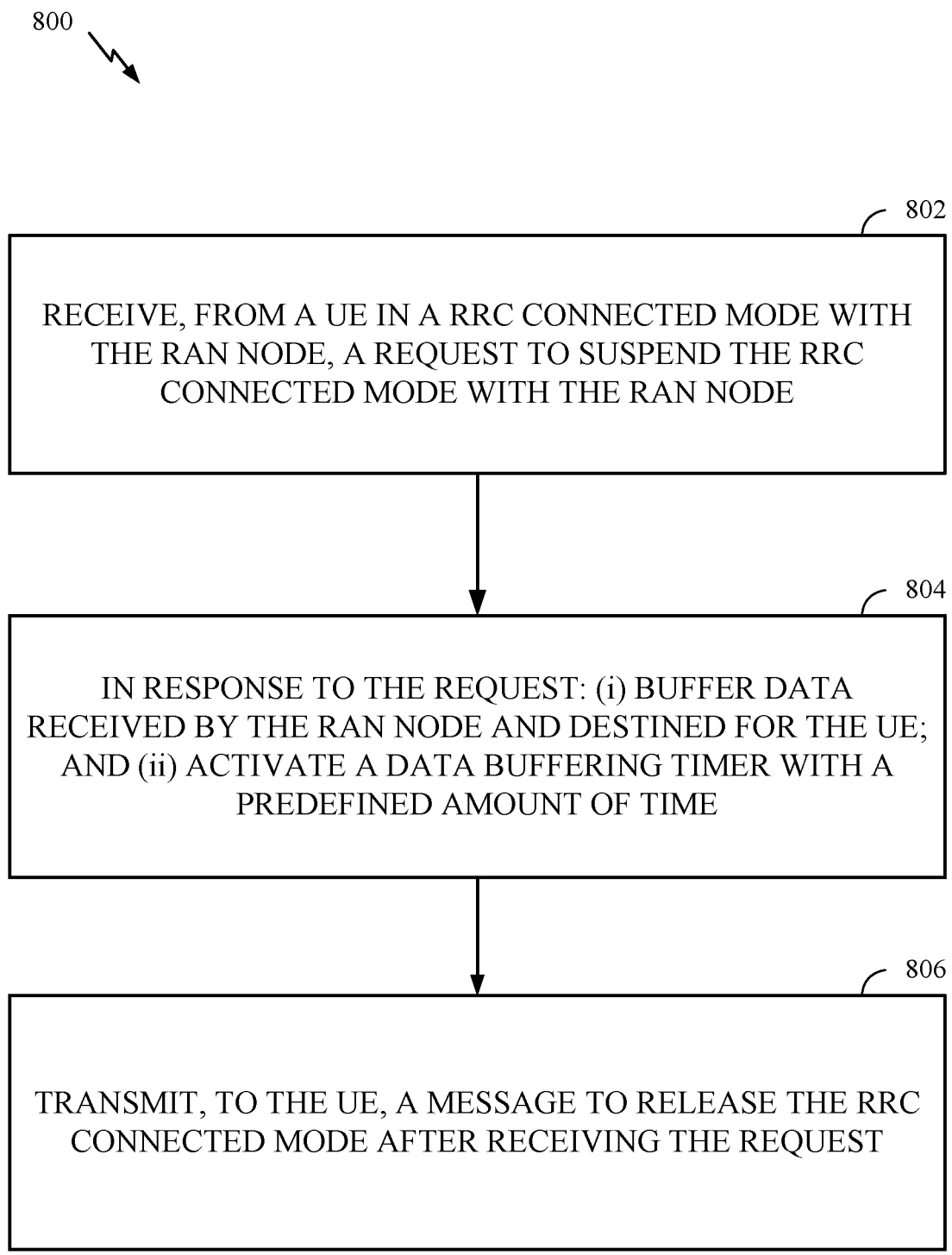
FIG. 8 is a flow diagram illustrating example operations for wireless communication by a RAN node, in accordance with certain aspects of the present disclosure.

FIG. 8 is a flow diagram illustrating example operations 800 for wireless communication, in accordance with certain aspects of the present disclosure. The operations 800 may be performed, for example, by a RAN node (e.g., BS 110a in the wireless communication network 100). Operations 800 may be implemented as software components that are executed and run on one or more processors (e.g., controller/processor 240 of FIG. 2). Further, the transmission and reception of signals by the RAN node in operations 800 may be enabled, for example, by one or more antennas (e.g., antennas 234 of FIG. 2). In certain aspects, the transmission and/or reception of signals by the RAN node may be implemented via a bus interface of one or more processors (e.g., controller/processor 240) obtaining and/or outputting signals.

The operations 800 may begin, at 802, where the RAN node receives, from a UE (e.g., UE 120a) in a RRC connected mode with the RAN node, a request to suspend the RRC connected mode with the RAN node (e.g., step 602 in FIG. 6). In one aspect, the RRC connected mode may be established between one (or a first) USIM of a plurality of USIMs of the UE and the RAN node. At 804, the RAN node, in response to the request: (i) buffers data received by the RAN node and destined for the UE (e.g., step 604 in FIG. 6) and (ii) activates a data buffering timer with a predefined amount of time (e.g., step 608 in FIG. 6). At 806, the RAN node transmits, to the UE, a message to release the RRC connected mode after receiving the request (e.g., step 606 in FIG. 6).

In some aspects, the RAN node (e.g., as part of operations 800) may determine whether to initiate a data suspend procedure with a network on behalf of the UE, based at least in part on whether the data buffering timer has expired. In one aspect, for example, the RAN node may determine to refrain from initiating the data suspend procedure with the network if the data buffering timer has not expired.

In one aspect, the RAN node may determine to initiate the data suspend procedure with the network if the data buffering timer has expired. The RAN node may initiate the data suspend procedure by transmitting a data suspend request to the network (e.g., step 610 in FIG. 6). The data suspend request may trigger the network to refrain from transmitting data destined for the UE to the RAN node (e.g., step 618 in FIG. 6).

In some aspects, the RAN node (e.g., as part of operations 800) may receive, from the UE, a request to resume the RRC connected mode with the RAN node (e.g., step 702 in FIG. 7). The request, in particular, may be to resume the RRC connected mode with the (first) USIM of the plurality of USIMs of the UE. The request to resume the RRC connected mode may be received, e.g., after the RAN node has suspended (or released) the RRC connected mode with the (first) USIM of the UE.

In some aspects, the RAN node may determine (e.g., as part of operations 800) whether to initiate a data resume procedure with the network (e.g., CN) on behalf of the UE, based at least in part on (i) whether the data buffering timer has expired and (ii) whether the RAN node has initiated a data suspend procedure with the network (e.g., step 708 in FIG. 7). In one aspect, for example, the RAN node may determine to refrain from initiating the data resume procedure with the network if (i) the data buffering timer has not expired and (ii) the RAN node has not initiated the data suspend procedure with the network (e.g., step 710 in FIG. 7). In one aspect, the RAN node may determine to refrain from initiating the data resume procedure with the network if (i) the data buffering timer has expired and (ii) the RAN node has not initiated the data suspend procedure with the network (e.g., step 710 in FIG. 7).

In one aspect, the RAN node, after determining to refrain from initiating the data resume procedure, may transmit (e.g., as part of operations 800) a message to resume the RRC connected mode if the RAN node is a last serving RAN node that received a suspend request from the UE (e.g., step 704 in FIG. 7). In one aspect, the RAN node, after determining to refrain from initiating the data resume procedure, may perform a RAN update with the network if the RAN node is not a last serving RAN node that received a suspend request from the UE. The RAN update, for example, may involve the new serving RAN retrieving a UE context and updating a signaling connection to the network (e.g., AMF).

In one aspect, the RAN node may determine to initiate the data resume procedure with the network if (i) the data buffering timer has expired and (ii) the RAN node has initiated the data suspend procedure with the network (e.g., steps 708 and 712 in FIG. 7). The RAN node may initiate the data resume procedure by transmitting a data resume request to the network to trigger the network to resume transmitting data destined for the UE to the RAN node (e.g., step 712 in FIG. 7).

Figure 9:
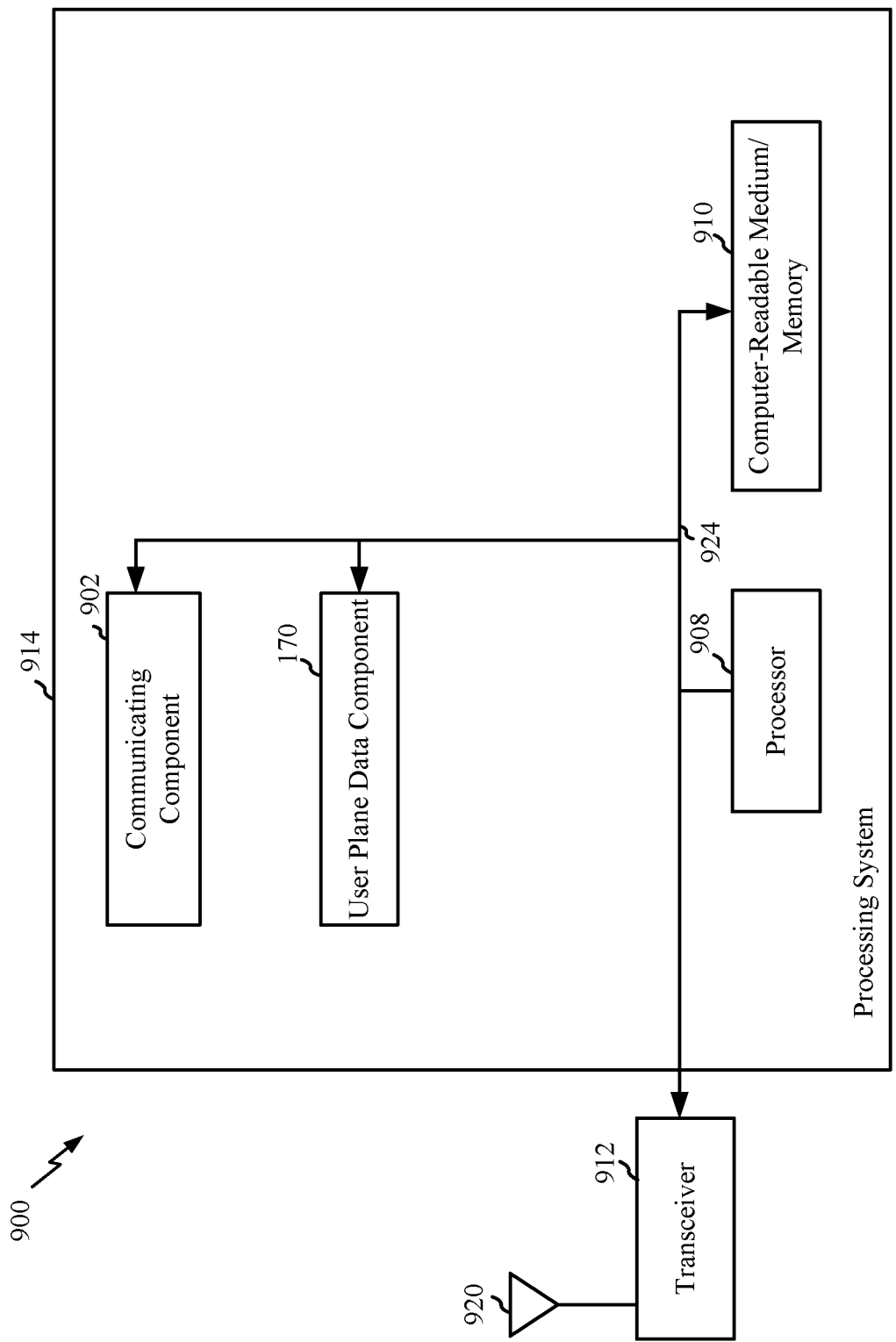
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations performed by the UE illustrated in FIGS. 6-7. The communications device 900 includes a processing system 914 coupled to a transceiver 912. The transceiver 912 is configured to transmit and receive signals for the communications device 900 via an antenna 920, such as the various signals described herein. The processing system 914 may be configured to perform processing functions for the communications device 900, including processing signals received and/or to be transmitted by the communications device 900.

The processing system 914 includes a processor 908 coupled to a computer-readable medium/memory 910 via a bus 924. In certain aspects, the computer-readable medium/memory 910 is configured to store instructions that when executed by processor 908, cause the processor 908 to perform the operations by the UE illustrated in FIGS. 6-7 and/or other operations for performing the various techniques discussed herein.

In certain aspects, the processing system 914 further includes a communicating component 902 for performing the operations by the UE illustrated in FIGS. 6-7 and/or other communication operations described herein. Additionally, the processing system 914 includes a user plane data component 170 for performing the operations by the UE illustrated in FIGS. 6-7 and/or operations described herein. The communicating component 902 and user plane data component 170 may be coupled to the processor 908 via bus 924. In certain aspects, the communicating component 902 and user plane data component 170 may be hardware circuits. In certain aspects, the communicating component 902 and user plane data component 170 may be software components that are executed and run on processor 908.

Figure 10:
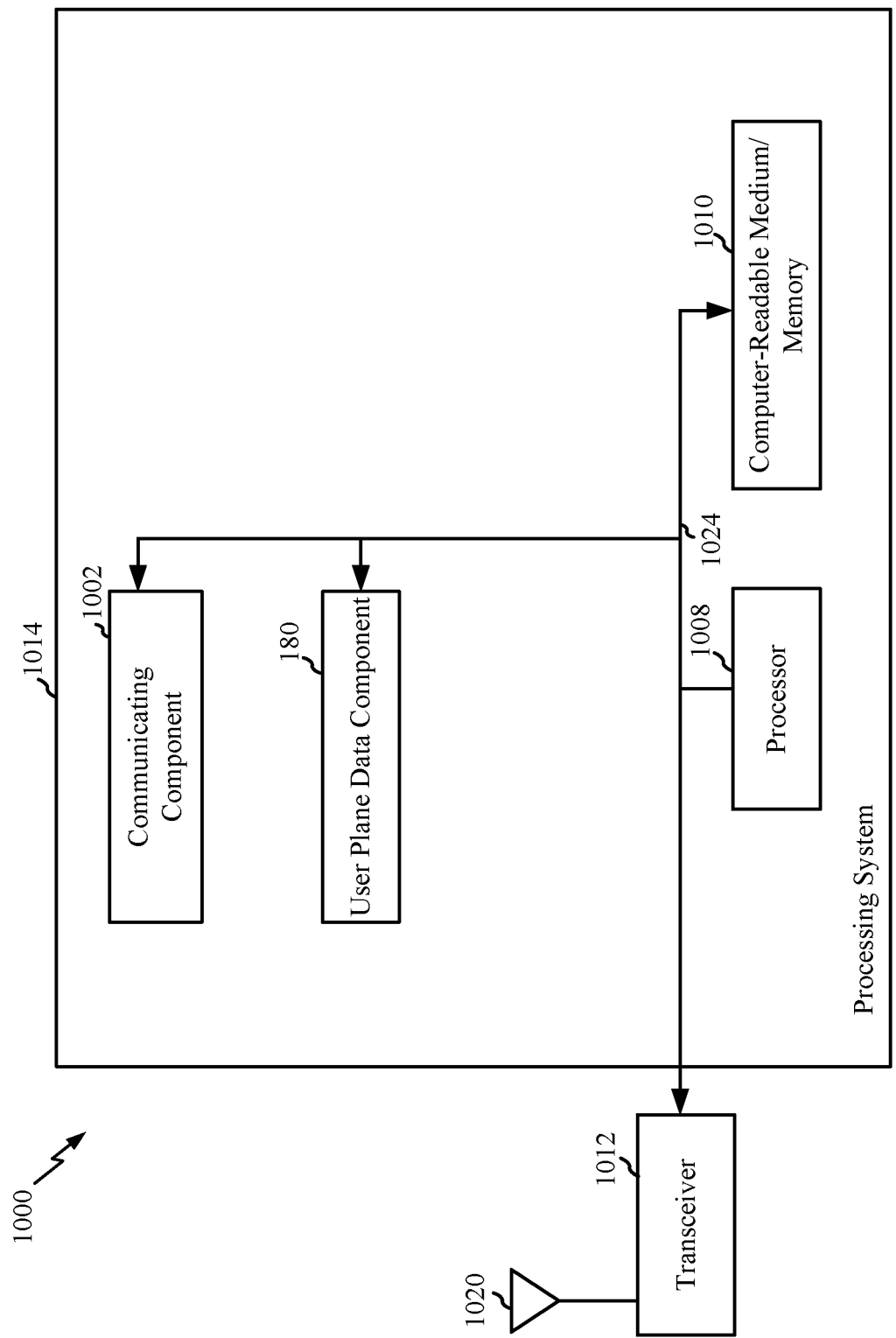
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations by the RAN illustrated in FIGS. 6-8. The communications device 1000 includes a processing system 1014 coupled to a transceiver 1012. The transceiver 1012 is configured to transmit and receive signals for the communications device 1000 via an antenna 1020, such as the various signals described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations by the RAN illustrated in FIGS. 6-8 and/or other operations for performing the various techniques discussed herein.

In certain aspects, the processing system 1014 further includes a communicating component 1002 for performing the operations by the RAN illustrated in FIGS. 6-7, operations illustrated at 802 and 806 in FIG. 8, and/or other communication operations described herein. Additionally, the processing system 1014 includes a user plane data component 180 for performing the operations by the RAN illustrated in FIGS. 6-7, operations illustrated at 802, 804, and 806 in FIG. 8, and/or other operations described herein. The communicating component 1002 and user plane data component 180 may be coupled to the processor 1008 via bus 1024. In certain aspects, the communicating component 1002 and user plane data component 180 may be hardware circuits. In certain aspects, the communicating component 1002 and user plane data component 180 may be software components that are executed and run on processor 1008.

Figure 11:
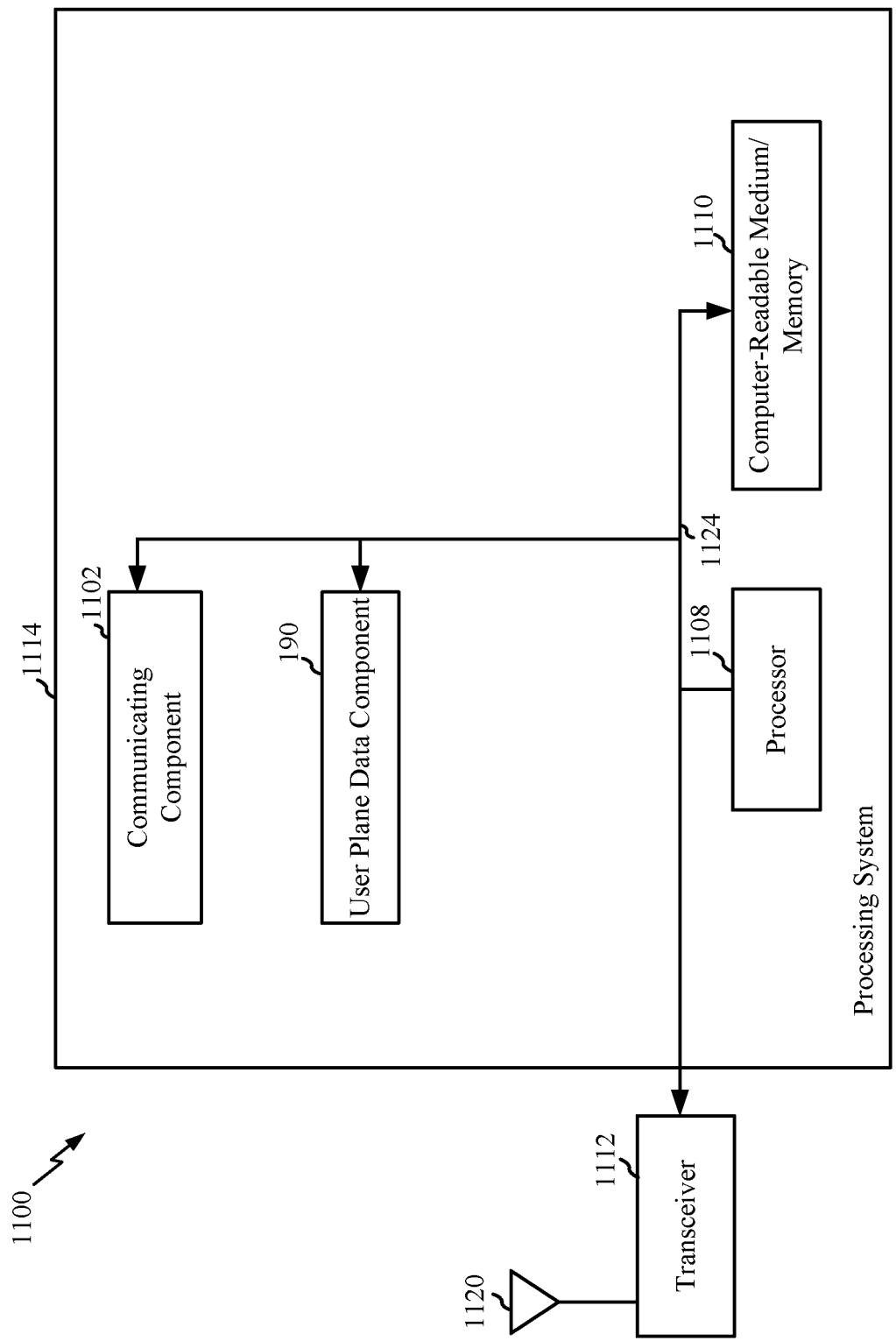
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations by one or more CN nodes illustrated in FIGS. 6-7. The communications device 1100 may be representative of a CN node (e.g., CN node 132a, such as an AMF, SMF, UPF, etc.). The communications device 1100 includes a processing system 1114 coupled to a transceiver 1112. The transceiver 1112 is configured to transmit and receive signals for the communications device 1100 via an antenna 1120, such as the various signals described herein. The processing system 1114 may be configured to perform processing functions for the communications device 1100, including processing signals received and/or to be transmitted by the communications device 1100.

The processing system 1114 includes a processor 1108 coupled to a computer-readable medium/memory 1110 via a bus 1124. In certain aspects, the computer-readable medium/memory 1110 is configured to store instructions that when executed by processor 1108, cause the processor 1108 to perform the operations by one or more CN nodes illustrated in FIGS. 6-7 and/or other operations for performing the various techniques discussed herein.

In certain aspects, the processing system 1114 further includes a communicating component 1102 for performing the operations by one or more CN nodes illustrated in FIGS. 6-7 and/or other communication operations described herein. Additionally, the processing system 1114 includes a user plane data component 190 for performing the operations by one or more CN nodes illustrated in FIGS. 6-7 and/or other operations described herein. The communicating component 1102 and user plane data component 190 may be coupled to the processor 1108 via bus 1124. In certain aspects, the communicating component 1102 and user plane data component 190 may be hardware circuits. In certain aspects, the communicating component 1102 and user plane data component 190 may be software components that are executed and run on processor 1108.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a radio access network (RAN) node, comprising:
 receiving, from a user equipment (UE) in a radio resource control (RRC) connected mode with the RAN node, a request to suspend the RRC connected mode with the RAN node;
 in response to the request:
  buffering data received by the RAN node and destined for the UE; and
  activating a data buffering timer with a predefined amount of time;
 transmitting, to the UE, a message to release the RRC connected mode after receiving the request; and
 determining whether to initiate a data suspend procedure with a network on behalf of the UE, based at least in part on whether the data buffering timer has expired.

2. The method of claim 1, wherein the determination is to initiate the data suspend procedure with the network if the data buffering timer has expired, the method further comprising transmitting, based on the determination, a data suspend request to the network to trigger the network to refrain from transmitting the data destined for the UE to the RAN node.

3. The method of claim 1, wherein the determination is to refrain from initiating the data suspend procedure with the network if the data buffering timer has not expired.

4. The method of claim 1, further comprising receiving, from the UE, a resume request to resume the RRC connected mode with the RAN node.

5. The method of claim 4, further comprising determining whether to initiate a data resume procedure with a network on behalf of the UE, based at least in part on (i) whether the data buffering timer has expired and (ii) whether the RAN node has initiated a data suspend procedure with the network.

6. The method of claim 5, wherein the determination is to refrain from initiating the data resume procedure with the network if (i) the data buffering timer has not expired and (ii) the RAN node has not initiated the data suspend procedure with the network.

7. The method of claim 6, further comprising transmitting, based on the determination, a resume message to the UE to resume the RRC connected mode if the RAN node is a last serving RAN node that received a suspend request from the UE.

8. The method of claim 6, further comprising performing, based on the determination, a RAN update with the network if the RAN node is not a last serving RAN node that received a suspend request from the UE.

9. The method of claim 5, wherein the determination is to initiate the data resume procedure with the network if (i) the data buffering timer has expired and (ii) the RAN node has initiated the data suspend procedure with the network.

10. The method of claim 9, further comprising transmitting, based on the determination, a data resume request to the network to trigger the network to resume transmitting the data destined for the UE to the RAN node.

11. A radio access network (RAN) node, comprising:
a receiver configured to receive, from a user equipment (UE) in a radio resource control (RRC) connected mode with the RAN node, a request to suspend the RRC connected mode with the RAN node;
at least one processor configured to, in response to the request:
buffer data received by the RAN node and destined for the UE; and
activate a data buffering timer with a predefined amount of time;
a transmitter configured to transmit, to the UE, a message to release the RRC connected mode after receiving the request;
the at least one process further configured to determine whether to initiate a data suspend procedure with a network on behalf of the UE, based at least in part on whether the data buffering timer has expired; and
a memory coupled to the at least one processor.

12. The RAN node of claim 11, wherein:
the at least one processor is configured to determine to initiate the data suspend procedure with the network when the data buffering timer has expired; and
the transmitter is further configured to transmit, based on the determination, a data suspend request to the network to trigger the network to refrain from transmitting the_data destined for the UE to the RAN node.

13. The RAN node of claim 11, wherein the at least one processor is configured to determine to refrain from initiating the data suspend procedure with the network when the data buffering timer has not expired.

14. The RAN node of claim 11, wherein the receiver is further configured to receive, from the UE, a resume request to resume the RRC connected mode with the RAN node.

15. The RAN node of claim 14, wherein the at least one processor is further configured to determine whether to initiate a data resume procedure with a network on behalf of the UE, based at least in part on (i) whether the data buffering timer has expired and (ii) whether the RAN node has initiated a data suspend procedure with the network.

16. The RAN node of claim 15, wherein the at least one processor is configured to determine to refrain from initiating the data resume procedure with the network when (i) the data buffering timer has not expired and (ii) the RAN node has not initiated the data suspend procedure with the network.

17. The RAN node of claim 16, wherein the transmitter is further configured to transmit, based on the determination, a resume_message to the UE to resume the RRC connected mode when the RAN node is a last serving RAN node that received a suspend request from the UE.

18. The RAN node of claim 16, wherein the at least one processor is configured to perform, based on the determination, a RAN update with the network if the RAN node is not a last serving RAN node that received a suspend request from the UE.

19. The RAN node of claim 15, wherein the at least one processor is configured to determine to initiate the data resume procedure with the network when (i) the data buffering timer has expired and (ii) the RAN node has initiated the data suspend procedure with the network.

20. The RAN node of claim 19, wherein the transmitter is configured to transmit, based on the determination, a data resume request to the network to trigger the network to resume transmitting the data destined for the UE to the RAN node.

21. A radio access network (RAN) node, comprising:
means for receiving, from a user equipment (UE) in a radio resource control (RRC) connected mode with the RAN node, a request to suspend the RRC connected mode with the RAN node;
means for buffering data received by the RAN node and destined for the UE in response to the request; and
means for activating a data buffering timer with a predefined amount of time in response to the request;
means for transmitting, to the UE, a message to release the RRC connected mode after receiving the request; and
means for determining whether to initiate a data suspend procedure with a network on behalf of the UE, based at least in part on whether the data buffering timer has expired.

22. A non-transitory_computer-readable medium, comprising code executable by one or more processors to perform an operation by a radio access network (RAN) node, the operation comprising:
receiving, from a user equipment (UE) in a radio resource control (RRC) connected mode with the RAN node, a request to suspend the RRC connected mode with the RAN node;
in response to the request:
buffering data received by the RAN node and destined for the UE; and
activating a data buffering timer with a predefined amount of time;
transmitting, to the UE, a message to release the RRC connected mode after receiving the request; and determining whether to initiate a data suspend procedure with a network on behalf of the UE, based at least in part on whether the data buffering timer has expired.

\* \* \* \* \*